United States Patent [19]

Bahr

[11] Patent Number: 4,531,714
[45] Date of Patent: Jul. 30, 1985

[54] STRINGING APPARATUS FOR PILOT LINES

[76] Inventor: Toralf Bahr, Greverudveien 2B, N-1415 Oppegård, Norway

[21] Appl. No.: 536,349

[22] Filed: Sep. 27, 1983

[30] Foreign Application Priority Data

Sep. 28, 1982 [NO] Norway .................................. 823263

[51] Int. Cl.³ .............................................. H02G 1/02
[52] U.S. Cl. ............................................. 254/134.3 R
[58] Field of Search ................ 254/134.3 R, 134.3 PA

[56] References Cited

U.S. PATENT DOCUMENTS

| | | | |
|---|---|---|---|
| 4,006,884 | 2/1977 | Lederhos et al. | 254/134.3 PA |
| 4,247,084 | 1/1981 | Lindsey et al. | 254/134.3 PA |
| 4,278,237 | 7/1981 | Bergman et al. | 254/134.3 PA |
| 4,421,301 | 12/1983 | Chapman | 254/134.3 R |

*Primary Examiner*—Frederick R. Schmidt
*Assistant Examiner*—Steven P. Schad
*Attorney, Agent, or Firm*—Finnegan, Henderson, Farabow, Garrett & Dunner

[57] ABSTRACT

A stringing apparatus for stringing a pilot line, optionally a phase line, within the frame of a power line tower of H-frame, portal or corset type, using a helicopter for drawing the pilot line, wherein the stringing apparatus is suspended from the helicopter by a strap and the pilot line is fastened to said apparatus.

The stringing apparatus comprises a frame with two arms which alternately retain the pilot line. By pivoting the arms, the frame can be opened and closed in two directions, toward the rear and at the top, permitting the frame as it is drawn past a cross member of the power line tower to guide the pilot line from the top side to the underside of the cross member, where the line rests in a block suspended from the cross member.

11 Claims, 11 Drawing Figures

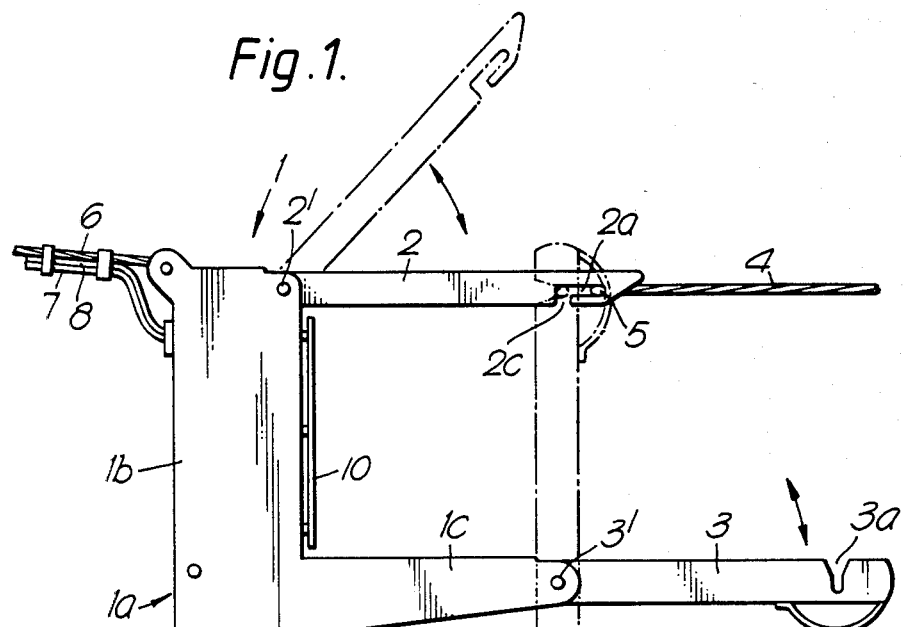
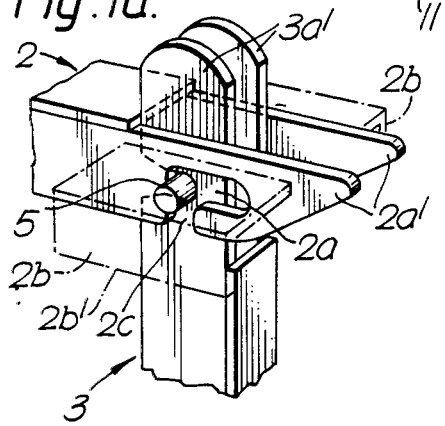
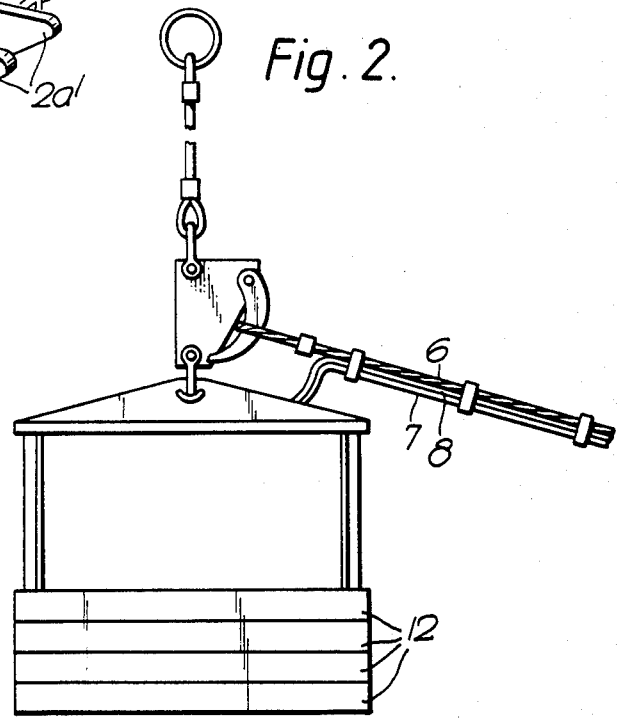
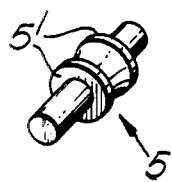

Fig. 3.
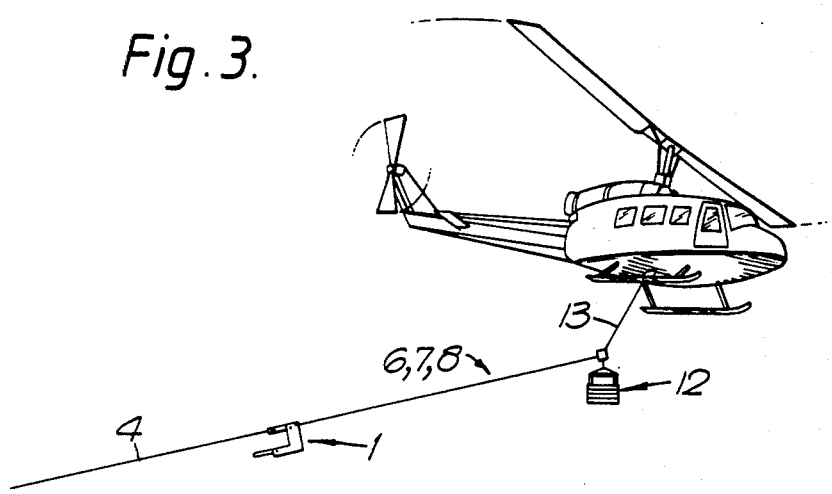
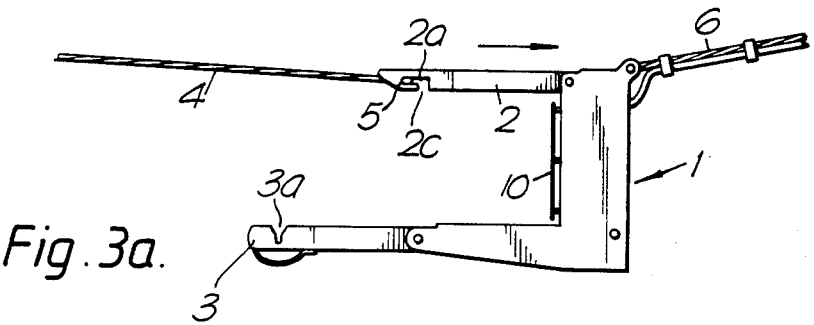
Fig. 3a.
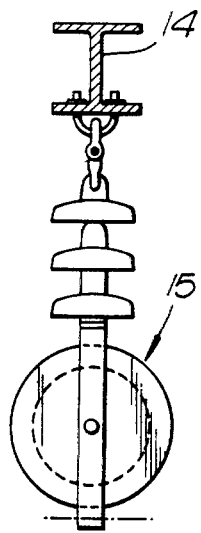
Fig. 3b.
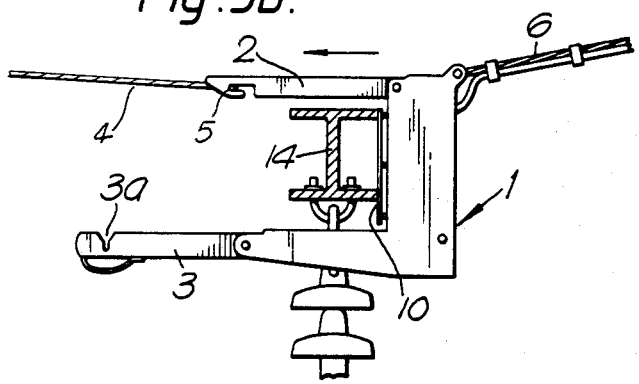

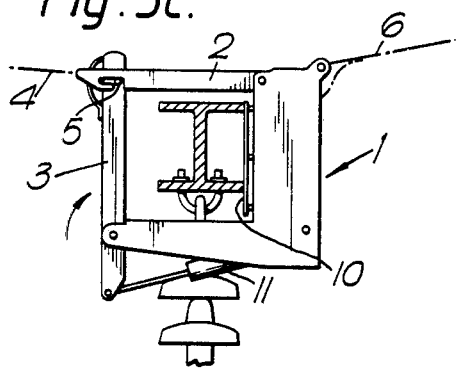
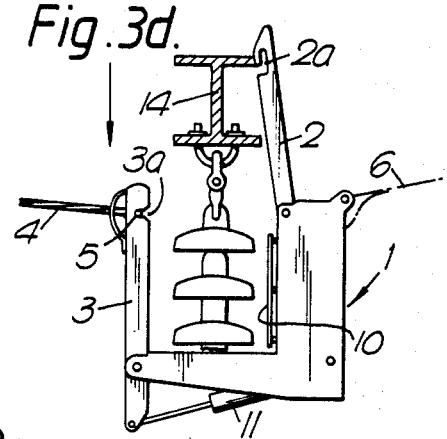
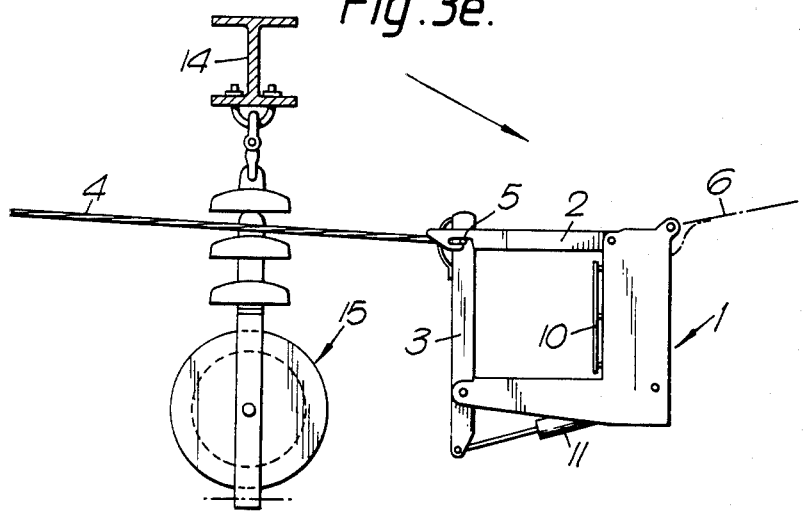
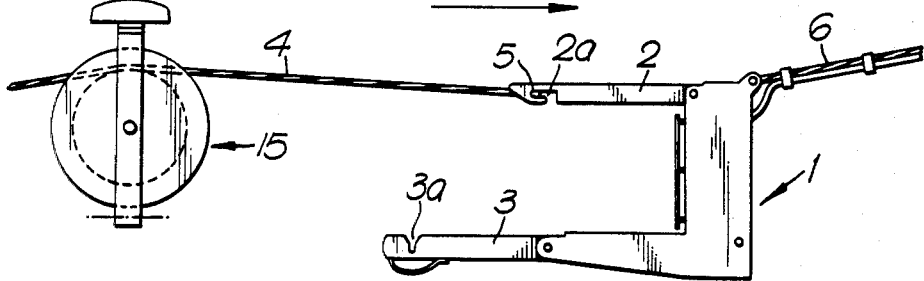

STRINGING APPARATUS FOR PILOT LINES

The present invention relates to a stringing apparatus to facilitate stringing helicopter-drawn pilot lines onto H-frame, portal, or corset type power line towers, wherein one or more lines are intended to be suspended within the frame of the tower.

When constructing a power line, it is convenient to use a helicopter for stringing the pilot lines.

In the case of phase lines and top lines which are suspended outside the tower frame, the helicopter can lay the pilot lines directly into open blocks provided with a closing mechanism. For the phases which are suspended within the frame of the tower, for instance underneath the cross member on a portal tower, it is not possible to string the line directly in this manner. The pilot line must first be guided into the frame, underneath the cross member, before it can be laid in the block. When the pilot line has been positioned within the blocks on all the towers, the phase line, which is connected to the remote end of the pilot line, is then drawn out in the usual manner and connected to insulators provided on the tower, and the line stringing blocks are removed.

At the present time two methods of stringing pilot lines with the aid of a helicopter are known. Both methods are of American origin. The first, called FLY-TRAP, has been developed by the Linsey Company in California. It consists of an apparatus called a "flytrap" which is mounted on top of the cross member on each tower, and a cable which is strung through the block in advance. The method works satisfactorily, but it requires a considerable amount of expensive equipment that has to be mounted, disassembled and maintained.

The second method has been developed by C. L. Chapman in cooperation with Rocky Mountain Helicopter. It comprises a pole, called a BOOMSTICK, about 9–10 meters long, which by means of a series of difficult maneuvers performed by the helicopter pilot is passed through the tower, under the cross member. This method is time-consuming and expensive, and it is also difficult to perform in windy weather.

The object of the present invention is to provide a pilot line stringing apparatus which does not require any special pre-arrangements on the tower, which permits automatic positioning of the line within the tower frame in just a few seconds with only relatively simple maneuvers being required of the helicopter pilot, and which permits the operation to be performed in any weather conditions under which a helicopter is normally allowed to fly.

This is obtained according to the invention by means of a stringing apparatus which is distinguished by the features recited in the characterizing clause of the appurtenant independent claim and the succeeding dependent claims.

The characteristic features of the apparatus will also be apparent from the following description of an embodiment of the invention, wherein reference is made to the accompanying drawings:

FIG. 1 shows the stringing apparatus in side view,

FIG. 1a shows the interaction of the horizontal and vertical arms with the bolt.

FIG. 1b shows the bolt that attaches to the pull line.

FIG. 2 shows a weight and hydraulic power system suspended on a line from the helicopter and connected to a wire leading to the stringing apparatus, FIG. 3 shows the helicopter in flight, carrying the stringing apparatus, and FIGS. 3a–f illustrate the successive steps of the stringing operation, whereby the pilot line is strung underneath the cross member on the power line tower.

The stringing apparatus 1, as shown in FIGS. 1 and 3, is suspended from a helicopter by means of a strap 13. A pilot line 4 is fastened to the stringing apparatus 1, which is drawn by helicopter into the frame of an H-frame, portal or corset tower.

The stringing apparatus comprises a basic element 1a which when in position in use exhibits a forward vertical member 1b, to the upper end of which the strap 13 or a wire 6 is fastened, and a horizontal bottom member 1c extending rearwardly from the element 1a. An upper horizontal arm 2 extends rearwardly from a pivotal support 2' at the upper end of the vertical member 1b. At the free end of the arm 2, a notch 2c cut into the bottom face of the arm terminates in a slot or groove 2a. The arm 2 can pivot freely from the horizontal position into an upward position when a catch mechanism is released. A lower horizontal arm 3 having an upwardly open transverse groove 3a at the free end thereof extends rearwardly from a pivotal support 3' at the rearward, free end of the lower horizontal member 1c. The arm 3 is maneuverable by pivoting means such as a pressure cylinder 11 from the horizontal position into an upward, vertical position, whereby the groove 3a comes into alignment with the slot 2a and the catch mechanism holding the upper arm 2 is released. The grooves 2a, 3a are intended to engage with a bolt 5 fastened to the end of the pilot line 4, for alternately retaining the bolt 5 during the stringing operation.

The pivot point 3' for the lower arm 3 is located almost directly beneath the groove 2a in the upper arm 2, whereby the basic element 1a, the arm 2 in the horizontal position and the arm 3 in the vertical position together form a quadrangular frame, and whereby said frame can be opened at the top and toward the rear by pivoting the arms 2,3 respectively.

The basic element 1a is an angle member composed of the vertical member 1b and the lower horizontal member 1c; together with the respective opposing arms 3,2, the angle member thus forms a quadrangular frame. In the space between the upper and lower horizontal arms 2,3, a switch (not illustrated) with a sensor plate 10 is mounted on the back side of the vertical member 1b of the basic element 1a, for registering surface contact with a body, for example, the cross member of the power line tower. When such surface contact is registered, a signal is transmitted to activate the pressure cylinder 11, which pivots the lower arm 3 with the transverse groove 3a upwardly into engagement with the bolt 5, thereby relieving the arm 2. The pressure of contact with said cross member causes the arm 2 to pivot upwardly, and the cross member is released from said space between the arms 2,3. A switch with a sensor (not illustrated) is arranged at the free end of the upper arm 2. After the arm 2 has pivoted upwardly to release the cross member and returned to the horizontal position, this sensor registers a surface contact with the upwardly pivoted lower arm 3, and transmits a signal to activate the pressure cylinder 11 for pivoting the arm 3 downwardly, thereby transferring the bolt 5 with the pilot line 4 from the groove 3a to the groove 2a.

In a preferred embodiment of the stringing apparatus, the groove 2a takes the form of a longitudinal slot in the upper arm 2, the forward end of the slot terminating in a notch 2c in the bottom face of the arm 2. The forward end of the slot 2a is an alignment with the bottom of the transverse groove 3a in the lower arm 3 when the free ends of the arms 2,3 are in the interacting position for retaining the bolt 5.

In a preferred embodiment, the pressure cylinder 11 is connected via a hydraulic hose 7 to a hydraulic power system that is disposed together with a weight 12 at the end of the strap 13 suspended from the helicopter, and the stringing apparatus 1 is connected to the weight 12 by means of a wire 6, which also carries the hydraulic hose or hoses 7 and an electrical cable 8 for transmitting the signals from the sensors in the basic element 1a and the upper arm 2, which respectively cause the lower arm 3 to pivot upwardly to relieve the upper arm 2, and to pivot downwardly to return to its horizontal starting position.

The free end of the upper arm 2 is preferably formed by two spaced-apart, parallel plates 2a',2a', each having a slot 2a. The free end of the lower arm 3 is also preferably formed as two spaced-apart, parallel plates 3a', 3a', each having a transverse groove 3a,3a. The distance between the plates 2a',2a' is greater than the width of the lower arm 3 with the transverse grooves 3a,3a, so that the lower arm 3 can freely pivot into a position between the two parallel plates 2a',2a' at the free end of the upper arm 2.

The bolt 5 has two radial guide surfaces 5',5', between which the pilot line 4 is fastened. The guide surfaces face away from each other, and the space between them is less than the distance between the plates 3a',3a' at the outer end of the lower arm 3, whereby the bolt 5 is guided axially while it is retained in the grooves 3a',3a' in the arm 3.

Outside the slots 2a,2a at the free end of the upper arm 2, guide plates 2b,2b are arranged parallel to and spaced apart from the parallel plates 2a',2a' of the arm 2 for engagement with the projecting ends of the bolt 5, thereby providing axial guidance of the bolt 5 while it is retained in the slots 2a,2a of the arm 2, the lower arm 3 being in the downwardly pivoted, horizontal position.

The lower margin 2b' of each guide plate 2b is preferably flush with the underside of the arm 2, thereby forming a slide surface which overlaps the downwardly open notch 2c of the slot 2a, in order to prevent the notch from catching on something as it passes.

The starting position of the stringing apparatus during use is shown in FIG. 3, where the stringing apparatus 1 is connected by a wire 6 to the weight 12, which in turn is connected to the helicopter by means of the strap 13. The pilot line 4 is fastened to the free end of the upper arm 2 by means of the bolt 5, which engages with the slot 2a in the arm 2. In this position, as shown in FIG. 3, the pilot line 4, the downwardly pivoted upper arm 2 of the stringing apparatus 1 and the wire 6 are in alignment with each other, and the stringing apparatus itself with its basic element 1a and the downwardly pivoted lower arm 3 is thus suspended in a stable position beneath the pilot line 4 and the wire 6.

The helicopter now draws the stringing apparatus 1 with the pilot line 4 toward a power line tower of the portal, H-frame or corset type, in order to string the pilot line 4 underneath the cross member 14 of the tower, as shown in FIG. 3a. The helicopter carries the stringing apparatus 1 with the pilot line 4 over the top of the cross member 14 and slightly beyond it, the lower arm 3 of the apparatus 1 being in a downwardly pivoted position.

The helicopter then decreases altitude and reverses somewhat so that the stringing apparatus 1 is guided onto the cross member 14, as shown in FIG. 3b. As this occurs, the cross member 14 comes into contact with the sensor plate 10, which registers the surface contact and sends a signal via a switch to the pressure cylinder 11, activating the cylinder to pivot the lower arm 3 into an upward position, whereupon the transverse groove 3a in the lower arm 3 engages with the bolt 5 attached to the pilot line 4 and thus supports the tension of the pilot line 4, the bolt 5 being guided forwardly in the slot 2a of the upper arm 2 and released via the downwardly open notch 2c. When the lower arm 3 has assumed this position, a catch mechanism (not shown), which up to now has held the upper arm 2 in a horizontal position, is released. The upper arm is now free to pivot upwardly and release the cross member 14, as the helicopter carrying the stringing apparatus 1 reduces altitude, as shown in FIG. 3d. After the cross member 14 has been released from the top end of the stringing apparatus 1, the helicopter pulls the stringing apparatus 1 with the pilot line 4 forward, passing beneath the cross member 14. Having been drawn past the cross member, the upper arm 2 falls once again into a horizontal position, so that its groove 2a engages with the pilot line bolt 5 lying in the groove 3a of the lower arm 3, as shown in FIG. 3e. The helicopter now draws the stringing apparatus 1 with the pilot line 4 obliquely downwards, so that the pilot line is retained in a block 15 suspended from the cross member 14. The lower arm 3 is subsequently pivoted downwardly by means of the pressure cylinder 11, which during this maneuver is preferably activated from the pilot cabin of the helicopter. As the lower arm 3 pivots downwardly, the catch mechanism for the upper arm 2 re-engages with the arm, so that the upper arm 2 is retained in a horizontal position and reassumes its support of the pilot line 4, the bolt 5 being retained in the slot 2a of the upper arm 2. The helicopter then draws the pilot line to the next power line tower and the above-described operation is repeated, FIG. 3f.

Said manual operation of the pressure cylinder 11 for causing the arm 3 to pivot downwardly may optionally be performed automatically. In that case, a switch disposed on the upper arm 2 or lower arm 3 will register that the upper arm 2 has fallen down into the horizontal position and send an electronic signal to activate the pressure cylinder, which then causes the lower arm 3 to pivot downwardly.

As mentioned previously, the stringing operation of the pilot line 4 beneath the cross member 14 with the aid of the stringing apparatus 1 and helicopter can be performed in just a few seconds by means of relatively simple maneuvers on the part of the helicopter pilot. During the string operation the helicopter can be flown more or less laterally, so that the pilot always has a good view of the apparatus, the pilot line and the cross member. As the helicopter flies laterally, the strap 13 with the weight 12 and the wire 6 with the hydraulic hose 7 and electrical cable 8 will extend on a downward and outward slant from the helicopter owing to the tension of the pilot line 4, as clearly seen in FIG. 3, which enables the helicopter pilot to keep the various components under surveillance during the stringing operation.

The electrical and hydraulic maneuvering system for pivoting the lower arm 3 up and down during the different phases of the stringing operation can be realized in a number of different ways, as known per se, and will not be described in greater detail in this specification.

The same observation applies with respect to the catch mechanisms for the upper arm 2, which holds the arm 2 in a horizontal position as shown in FIG. 1 and which is released by the upward pivoting of the lower arm 3, thus permitting the upper arm 2 to pivot freely upward when the cross member 14, as shown in FIG. 3d, presses against the upper arm 2 and is released from the frame of the stringing apparatus 1.

Said catch mechanism for the upper arm 2 may be a strictly mechanical device, wherein an axially movable rod projects outwardly a distance into the slot 2a and is influenced by the upward pivoting of the lower arm, so that said rod releases a catch pin, which engages with an extension of the upper arm 2 past its support 2'.

Having described my invention, I claim:

1. An apparatus for stringing a pilot line or phase line within the frame of a power line tower of H-frame, portal or corset type, utilizing a helicopter for drawing the pilot line and wherein the stringing apparatus is suspended by a strap from the helicopter and the pilot line is fastened to said apparatus, comprising a basic element that includes a forward, vertical member, with the strap fastened to the upper end thereof, and a lower, rearwardly extending horizontal member, a horizontal, rearwardly extending upper arm pivotally connected at one end to the upper end of the vertical member to permit the arm to pivot freely upwardly from the horizontal position following its release and having a downwardly open notch terminating in a recessed groove at the free end thereof, a horizontal, rearwardly extending lower arm pivotally connected at one end to the rear end of the horizontal member and having an upwardly open transverse groove at the free end thereof, means for pivoting the lower arm between a horizontal position and a vertical position wherein its groove is brought into alignment with the groove in the upper arm, a bolt fastened to the end of the pilot line, said bolt being initially retained in the groove of the upper arm, and a catch mechanism for holding the upper arm in its horizontal position until the lower arm is brought up into its vertical position whereby the bolt is transferred to the groove in the lower arm and the upper arm is released from the catch mechanism to pivot upwardly.

2. The apparatus of claim 1, in which the pivot point for the lower arm is located substantially directly below the groove in the upper arm, whereby the basic element together with said lower and upper arms in vertical and horizontal positions respectively, forms a frame, which by reason of the pivotable arms can be alternately opened at the top and toward the rear thereof.

3. The apparatus of claim 2, in which the basic element is a right angle member composed of the forward vertical member and the lower horizontal member, which together with the arms, form a quadrangular frame.

4. The apparatus of claim 1, including a switch having a sensor plate, located in the space between the upper and lower horizontal arms and on the back side of the vertical member of the basic element for contact with the frame of the portal tower, said sensor upon contact transmitting a signal to activate the pivoting means to pivot upwardly the lower arm, whereby the transverse groove in the lower arm is brought up into alignment with the recessed groove in the upper arm and engagement with the bolt, said movement of the lower arm releasing the catch mechanism to transfer the bolt to the groove in the lower arm and release the upper arm, which upon surface pressure from said frame is pivoted upwardly by it, thereby releasing said frame upwardly from said space between the arms.

5. The apparatus of claim 4, including a switch having a sensor at the free end of the upper arm, which, following an upward pivoting and subsequent downward pivoting of the upper arm into a horizontal position, registers surface contact with the upwardly pivoted lower arm and transmits a signal to activate the pivoting means, causing the means to pivot the lower arm downwardly, thereby transferring the bolt from the upwardly open transverse groove in the lower arm back to said recessed groove in the upper arm.

6. The apparatus of claim 5, in which the pivoting means is a pressure cylinder and including a hydraulic power system suspended from the strap intermediate the helicopter and the apparatus disposed together with a weight and a hydraulic hose connecting the cylinder to the power system and an electrical cable for transmitting signals from the sensors on the basic element and the upper arm to the power system.

7. The apparatus of claim 1, in which the groove in the upper arm is in the form of a longitudinal slot, the forward end of the slot opening downwardly at the bottom face of the arm, said forward end of the slot being in alignment with the bottom of the transverse groove in the lower arm when the free ends of the two arms are in mutually engaged position for retaining the bolt.

8. The apparatus of claim 7, wherein the free end of the upper arm comprises two spaced apart, parallel plates each having a recessed groove therein and the free end of the lower arm comprises two spaced apart, parallel plates each having a transverse groove therein, wherein the distance between the plates of the upper arm is greater than the width of the free end of the lower arm.

9. The apparatus of claim 8, wherein the bolt has two projecting ends for engagement with the grooves in the arms and two radial guide surfaces intermediate the ends, with one surface on each side of the point of attachment of the pilot line to the bolt and facing away from each other, said guide surfaces being spaced apart a distance less than the distance between the plates of either the upper or lower arm, for axial guidance of the bolt during its retention in the grooves of the arms.

10. The apparatus of claim 9, wherein guide plates are provided outside the grooves of the upper arm, disposed parallel to but spaced apart from the parallel plates of said arm, for engagement with the projecting ends of the bolt to thereby provide axial guidance for the bolt during its retention in the groove of the upper arm when the lower arm is in a horizontal position.

11. The apparatus of claim 10, wherein the lower end of each guide plate is flush with the bottom face of the upper arm, thereby forming a slide surface which overlaps the downwardly directed notch opening of the recessed groove.

* * * * *